US012111034B1

(12) United States Patent
Yoon et al.

(10) Patent No.: US 12,111,034 B1
(45) Date of Patent: Oct. 8, 2024

(54) EXTERNAL LIGHTING APPARATUS WITH A LIGHT GUIDE FOR A PLURALITY OF LIGHT SOURCES TO CREATE A PLURALITY OF ILLUMINATION IMAGES

(71) Applicants: HYUNDAI MOTOR COMPANY, Seoul (KR); KIA CORPORATION, Seoul (KR); HYUNDAI MOBIS CO., LTD., Seoul (KR); PLAKOR CO., LTD., Hwaseong-si (KR); HATBIT ILLUCOM CO., LTD, Bucheon-si (KR)

(72) Inventors: Jin Young Yoon, Gimpo-si (KR); Dong Eun Cha, Hwaseong-si (KR); Hong Heui Lee, Suwon-si (KR); Seong Kwon Kim, Hwaseong-si (KR); Byung Lea Cho, Hwaseong-si (KR); Youn Woo Park, Hwaseong-si (KR); Seok Heon Yoon, Hwaseong-si (KR); Jae Gyun Sa, Goyang-si (KR); Young Sik Kim, Hwaseong-si (KR); Young Ho Cha, Incheon (KR)

(73) Assignees: HYUNDAI MOTOR COMPANY, Seoul (KR); KIA CORPORATION, Seoul (KR); HYUNDAI MOBIS CO., LTD., Seoul (KR); PLAKOR CO., LTD., Hwaseong-si (KR); HATBIT ILLUCOM CO., LTD, Bucheon-si (KR)

( * ) Notice: Subject to any disclaimer, the term of this patent is extended or adjusted under 35 U.S.C. 154(b) by 0 days.

(21) Appl. No.: 18/372,569

(22) Filed: Sep. 25, 2023

(30) Foreign Application Priority Data

Apr. 19, 2023 (KR) .......................... 10-2023-0051532

(51) Int. Cl.
*F21S 43/249* (2018.01)
*B60Q 1/26* (2006.01)
(Continued)

(52) U.S. Cl.
CPC .......... *F21S 43/249* (2018.01); *B60Q 1/2661* (2013.01); *B60Q 1/543* (2022.05);
(Continued)

(58) Field of Classification Search
CPC ........ B60Q 1/2661; B60Q 1/28; B60Q 1/503; B60Q 1/5035; B60Q 1/5037;
(Continued)

(56) References Cited

U.S. PATENT DOCUMENTS 7,804,260 B2   9/2010   Deurenberg
9,789,814 B2  10/2017   Tanaka et al.
(Continued)

FOREIGN PATENT DOCUMENTS

EP   3860312 A1   8/2021
JP   2009514206 A   4/2009
(Continued)

*Primary Examiner* — Abdulmajeed Aziz
*Assistant Examiner* — Steven Y Horikoshi
(74) *Attorney, Agent, or Firm* — Lempia Summerfield Katz LLC

(57) ABSTRACT

An external lighting apparatus delivers various messages through selective lighting by applying a lighting function to the exterior of a vehicle. The apparatus includes a light source module with a plurality of light sources and a light guide in which light emitted from the light sources is incident. The light guide reflects the incident light so that the light travels in different areas. The apparatus has a light cover composed of a plurality of transmission parts into which the light, travelling in different areas via the light (Continued)

guide, is incident. The light is emitted to different lighting areas through each transmission part to create a plurality of illumination images.

15 Claims, 8 Drawing Sheets

(51) Int. Cl.
  *B60Q 1/50* (2006.01)
  *F21S 43/15* (2018.01)
  *F21S 43/19* (2018.01)
  *F21S 43/245* (2018.01)

(52) U.S. Cl.
  CPC .............. *B60Q 1/545* (2022.05); *F21S 43/15* (2018.01); *F21S 43/19* (2018.01); *F21S 43/245* (2018.01)

(58) Field of Classification Search
  CPC ...... F21S 43/236; F21S 43/241; F21S 43/242; F21S 43/245; F21S 43/249; G02B 6/0078; G02B 6/008
  See application file for complete search history.

(56) References Cited

U.S. PATENT DOCUMENTS

| | | | |
|---|---|---|---|
| 10,837,617 | B2 | 11/2020 | Kurashige et al. |
| 11,293,616 | B1 | 4/2022 | Ahn et al. |
| 11,306,890 | B2 | 4/2022 | Choi et al. |
| 2008/0246419 | A1 | 10/2008 | Deurenberg |
| 2015/0210226 | A1* | 7/2015 | Topart ................ B60Q 3/14 362/509 |
| 2016/0090027 | A1 | 3/2016 | Tanaka et al. |
| 2020/0088379 | A1 | 3/2020 | Kurashige et al. |
| 2020/0340640 | A1* | 10/2020 | Min ..................... F21V 5/007 |
| 2021/0164631 | A1* | 6/2021 | Niu ..................... F21S 41/16 |
| 2021/0254806 | A1 | 8/2021 | Choi et al. |
| 2022/0099266 | A1 | 3/2022 | Ahn et al. |
| 2022/0107071 | A1* | 4/2022 | Ahn ................... B29C 66/112 |
| 2023/0150417 | A1* | 5/2023 | Muegge ............. F21S 43/15 362/517 |

FOREIGN PATENT DOCUMENTS

| | | |
|---|---|---|
| JP | 6194512 B2 | 9/2017 |
| JP | 6194540 B2 | 9/2017 |
| JP | 6881472 B2 | 6/2021 |
| JP | 2022066679 A | 5/2022 |
| KR | 19990024905 U | 7/1999 |
| KR | 200197823 Y1 | 4/2001 |
| KR | 102329632 B1 | 11/2021 |
| KR | 20220010226 A | 1/2022 |
| KR | 20220042769 A | 4/2022 |
| KR | 20220100457 A | 7/2022 |
| KR | 20220152832 A | 11/2022 |

* cited by examiner

EXTERNAL LIGHTING APPARATUS WITH A LIGHT GUIDE FOR A PLURALITY OF LIGHT SOURCES TO CREATE A PLURALITY OF ILLUMINATION IMAGES

CROSS REFERENCE TO RELATED APPLICATIONS

The present application claims priority to Korean Patent Application No. 10-2023-0051532, filed Apr. 19, 2023, the entire contents of which are incorporated herein for all purposes by this reference.

BACKGROUND

1. Technical Field

The present disclosure relates to an external lighting apparatus that delivers a message by means of a lighting function applied to the exterior of a vehicle and enhances the appearance and marketability of the vehicle.

2. Description of the Related Art

In general, cooling of powertrain components and cooling system components is required in vehicles. Accordingly, a grille is formed at the front portion of a vehicle to allow air to circulate in order to cool the powertrain components and the cooling system components.

In other words, when a vehicle is driven, air that flows through a grille passes through the powertrain components and the cooling system components. Thus, each component can be cooled through heat exchange with the air.

Recently, with the introduction of electric vehicles and fuel cell vehicles, a grille for cooling powertrain components and cooling system components of a vehicle is not required. Conventional grilles are provided to be always open so that the powertrain components and cooling system components are always in heat-exchange with the ambient air. In the case of electric vehicles and fuel cell vehicles that do not require cooling by using such a grille, a closed grille is applied to improve aerodynamic performance.

Meanwhile, vehicles nowadays are equipped with lamps to convey information to other vehicles or pedestrians. Yet, the problem with a lamp is that visibility is somewhat decreased as the lamp conveys a specific message by projecting light on the road surface.

The description provided above as related art to the present disclosure is to help understand the background of the present disclosure. The above description should not be construed as being included in the related art known by those of ordinary skill in the art.

SUMMARY

Objectives of the present disclosure are to provide an external lighting apparatus that delivers various information or messages through lighting by applying a lighting function to the exterior of a vehicle and that improves marketability by refining the exterior design of the vehicle.

In order to achieve the objectives of the present disclosure, an external lighting apparatus is provided. The external lighting apparatus includes a light source module provided with a plurality of light sources. The apparatus also includes a light guide in which light emitted from each light source is incident. The light guide is configured to reflect the incident light so that the light travels in different areas. The apparatus also includes a light cover composed of a plurality of transmission parts into which the light, travelling in different areas by means of the light guide, is incident. The light is emitted to different lighting areas through each transmission part to create a plurality of illumination images.

The light source module may include a plurality of light sources made to be individually lit and a flexible substrate made to be deformable and extended. The plurality of light sources may be mounted thereon at regular intervals.

The light guide may be provided with a plurality of guide parts for guiding the light emitted from each light source. The guide parts may reflect light inward and outward so that light emitted from some of the light sources is reflected from the inside and moved while light emitted from the remaining light sources is reflected from the outside and moved.

Among the light sources of the light source module, some light sources may be disposed inside the guide parts and some light sources may be disposed between the guide parts having the light sources therein.

The light cover may include a first transmission part into which light moved from the inside of the guide parts is incident and may include a second transmission part into which light moved from the outside of the guide parts is incident. The first transmission part and the second transmission part may be disposed to have different lighting areas.

In the light cover, a plurality of the second transmission parts may be provided to have a pattern and the plurality of second transmission parts may be spaced apart from each other. The first transmission part may extend to cross between the second transmission parts.

As each of the guide parts is provided to narrow toward the light cover, an outer portion may be formed to be inclined. An end of the narrowed part may match the second transmission part.

A light reflecting material may be deposited on each of the guide parts so that light is reflected on the outer portion.

Inside the guide part, a light incident portion may be provided and configured to extend to the light source so that light emitted from the light source is incident and to reflect the incident light so that the light travels toward the first transmission part.

In the light cover, the first transmission part and the second transmission part may have different thicknesses.

In the light cover, the first transmission part may have a lesser thickness than the second transmission part.

A light blocking material may be deposited on the second transmission part of the light cover so that light is not transmitted in a remaining area thereof except for a point matched in a straight line with the light source.

The external lighting apparatus of the present disclosure may further include a controller configured to control the light source module. The controller may control the light source module so that some of the light sources are turned on or individual light sources are sequentially turned on according to specific information including driving status, surrounding environment, message conveying, and charging status.

The light cover may be an exterior part including a front grill, an exterior panel, or a lamp of a vehicle.

The light cover may be provided with an insert film and a light transmission paint or a light blocking material may be deposited on the insert film.

According to an external lighting apparatus having the structure described above, various information or messages can be delivered through lighting by applying a lighting function to the exterior of a vehicle. Also, marketability can be improved by refining the exterior design of a vehicle.

DETAILED DESCRIPTION

Figure 1:
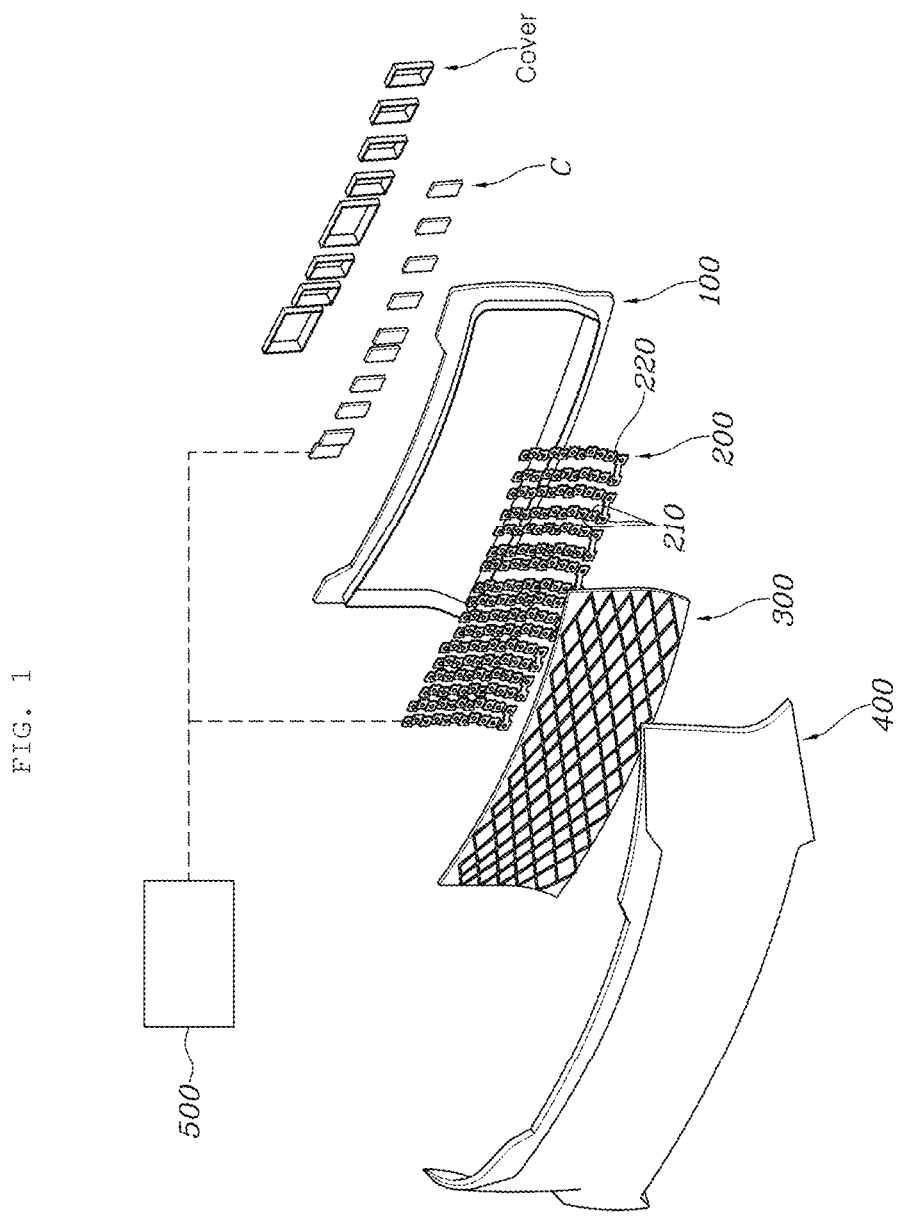
FIG. 1 is a view showing an external lighting apparatus according to an embodiment of the present disclosure.

Hereafter, embodiments of the present disclosure are described in detail with reference to the accompanying drawings. The same or similar components are given the same reference numerals throughout the drawings and are not repeatedly described.

The terms "module" and "unit (part/portion)" that are used for components in the following description are used only for the convenience of description without having discriminate meanings or functions.

In the following description, where it has been determined that the detailed description of known technologies related to the present disclosure would make the subject matter of the embodiments described herein unclear, such detailed description has been omitted. Further, the accompanying drawings are provided only for understanding embodiments disclosed in the specification. The technical spirit disclosed in the specification is not limited by the accompanying drawings. Also, all changes, equivalents, and replacements should be understood as being included in the spirit and scope of the present disclosure.

Terms including ordinal numbers such as "first", "second", etc. may be used to describe various components, but the components are not to be construed as being limited by these terms. The terms are used only to distinguish one component from another component.

It is to be understood that, when one element is referred to as being "connected to" or "coupled to" another element, the one element may be connected directly to or coupled directly to another element or may be connected to or coupled to another element with a further element intervening therebetween. On the other hand, it should to be understood that, when one element is referred to as being "connected directly to" or "coupled directly to" another element, the one element may be connected to or coupled to another element without any further element intervening therebetween.

Singular forms are intended to include plural forms unless the context clearly indicates otherwise. When a component, device, element, or the like of the present disclosure is described as having a purpose or performing an operation, function, or the like, the component, device, or element should be considered herein as being "configured to" meet that purpose or perform that operation or function.

It should be further understood that the terms "comprise" or "have" and variations thereof used in this specification specify the presence of stated features, steps, operations, components, parts, or a combination thereof. Such terms do not preclude the presence or addition of one or more other features, numerals, steps, operations, components, parts, or a combination thereof.

A controller may include a communication device that communicates with another controller or a sensor to control corresponding functions. The controller may also include a memory that stores an operating system or logic commands and input/output information. The controller may also include one or more processors that perform determination, calculation, decision, etc. for controlling the corresponding functions.

An external lighting apparatus according to embodiments of the present disclosure is described hereafter with reference to the accompanying drawings.

Figure 2:
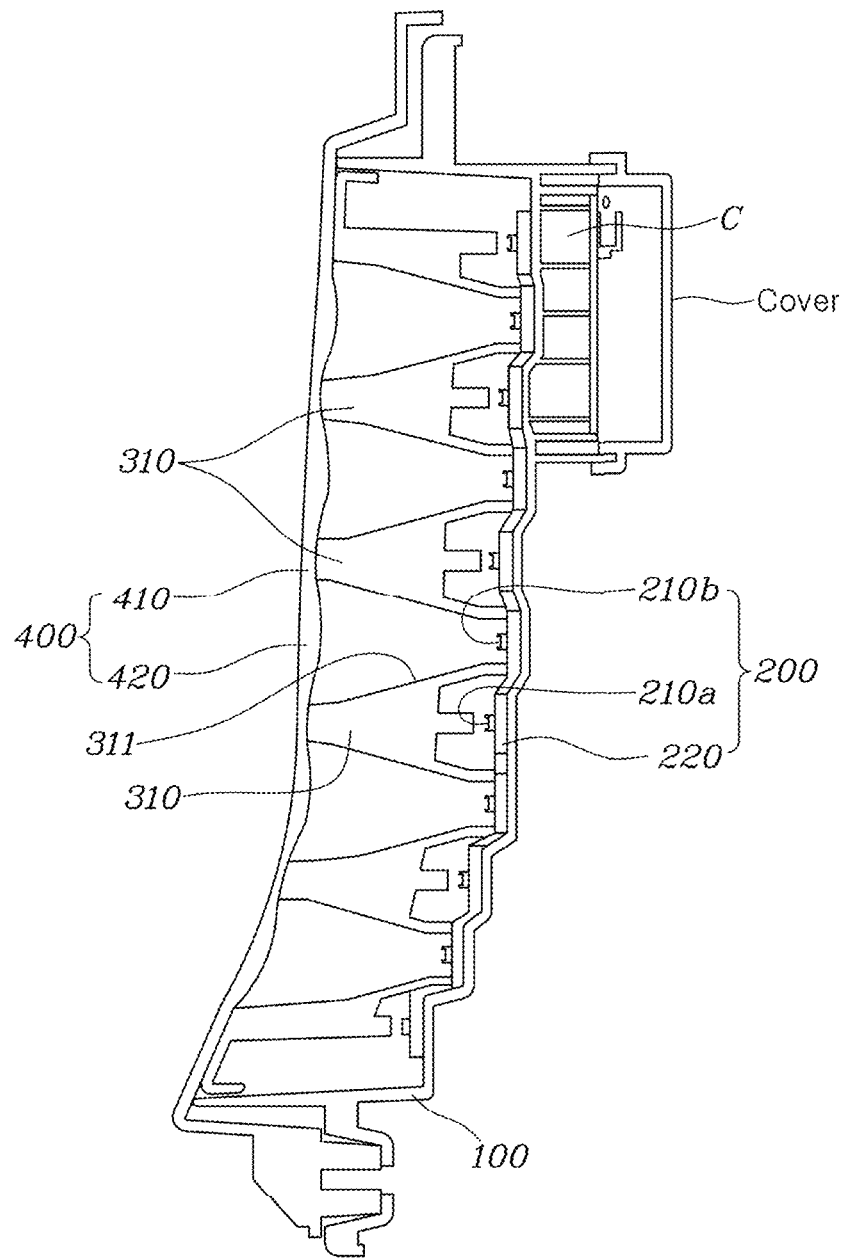
FIG. 2 is a cross-sectional view of the external lighting apparatus shown in FIG. 1.

As shown in FIGS. 1 and 2, an external lighting apparatus according to the present disclosure includes a light source module 200 equipped with a plurality of light sources 210 and a light guide 300 in which light emitted from each light source 210 is incident and reflects the incident light so that the light travels in different areas. The external lighting apparatus also has a light cover 400 composed of a plurality of transmission parts into which the light, travelling in different areas via the light guide 300, is incident. The light is emitted to different lighting areas through each transmission part to create a plurality of illumination images.

In addition, the present disclosure may further include a housing 100 in which the light source module 200, the light guide 300, and the light cover 400 are mounted. The housing 100 may be mounted and fixed to a body frame of a vehicle.

The external lighting apparatus according to the present disclosure may be composed of exterior parts including a front grille of a vehicle, an exterior panel, or a lamp. The exterior parts are parts exposed to the outside of a vehicle and may include a spoiler, a roof rack, a body panel, or the like in addition to a front grille, an exterior panel, or a lamp.

In order to help understand the present disclosure, the exterior parts are applied according to an embodiment of a front grille of a vehicle. Accordingly, the light cover 400 may be configured as the front grille of the vehicle.

The light source module 200 is mounted on the housing 100 and the light source module 200 includes the plurality of light sources 210. The light sources 210 may be composed of LEDS.

In particular, the light guide 300 and the light cover 400 are provided in front of the light source module 200 and the light guide 300 and the light cover 400 may be mounted on the housing 100.

The light guide 300 guides the movement of light so that the light emitted from the light sources 210 may be transmitted through the light cover 400. The light guide 300 is provided with a plurality of guide parts 310 formed to reflect the light emitted from the light sources 210.

In other words, the light guide 300 is provided with the guide parts 310 for guiding the light emitted from each light source 210. The guide parts 310 are formed to reflect light inward and outward so that light emitted from some of the light sources 210 is reflected from the inside and moved, i.e., redirected or transmitted, while light emitted from the remaining light sources 210 is reflected from the outside and moved, i.e., redirected or transmitted.

In this way, the guide parts 310 are formed so that light is totally reflected inward and outward. Thus, the light emitted from the light sources 210 provided inside the guide parts 310 is reflected from the inside of the guide parts 310 and moved whereas the light emitted from the light sources 210 provided outside the guide parts 310 is reflected from the outside of the guide parts 310 and moved. In particular, the light reflected from the outside of the guide parts 310 and moved is reflected on the outer surfaces of different guide parts 310 as the plurality of guide parts 310 are disposed to be spaced apart from each other.

The light moved by the light guide 300 passes through the light cover 400 and is emitted to the outside. The light cover 400 is composed of first transmission parts 410 into which the light moved from the inside of the light guides 300 is incident and second transmission parts 420 into which the light moved from the outside of the light guides 300 is incident.

In particular, as the first transmission parts 410 and the second transmission parts 420 of the light cover 400 are arranged to have different lighting areas, the light emitted through the first transmission parts 410 and the light emitted through the second transmission parts 420 are distinguished. Thus, various illumination images may be created by a combination of light emitted through the first transmission parts 410 and the second transmission parts 420. In other words, the light cover 400 may be considered to have a first transmission part 410 defining a plurality of first lighting regions, or to have a plurality of the first transmission parts 410, each defining a first lighting region of the light cover 400. Likewise, the light cover 400 may be considered to have a second transmission part 420 defining a plurality of second lighting regions, or to have a plurality of the second transmission parts 420, each defining a second lighting region of the light cover 400.

To describe the embodiments of the present disclosure described above in more detail, the light source module 200 may have the plurality of light sources 210 made to be individually lit. Also, a flexible and elongate substrate 220 installed in the housing 100 may extend so that the plurality of light sources 210 are mounted to be spaced apart from each other at regular intervals. The substrate 220 may be deformable according to the outer shape of the housing 100.

Figure 3:
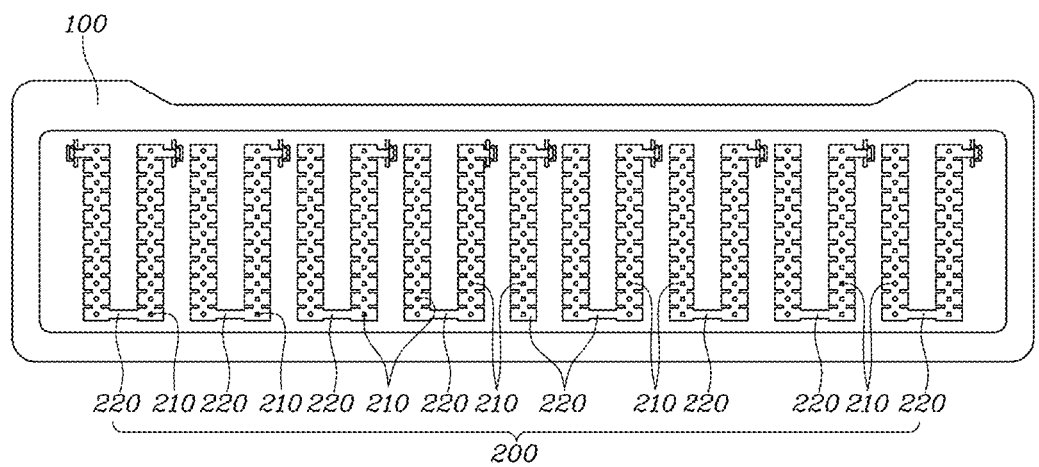
FIG. 3 is a view showing a light source module of the external lighting apparatus shown in FIG. 1.

As shown in FIG. 3, the light source module 200 includes the light sources 210 and the flexible substrate 220. The light sources 210 may be composed of LEDs and may be mounted on the flexible substrate 220. In addition, the light sources 210 are configured to emit light of various colors and each light source 210 is configured to be individually turned on, thereby forming various illumination images.

Among the light sources 210 of the light source module 200, some light sources 210 are disposed inside the guide parts 310 and some light sources 210 are disposed between the guide parts 310 having the light sources therein.

In this way, the plurality of light sources 210 are classified into the light sources 210 disposed inside the guide parts 310 and the light sources 210 disposed outside the guide parts 310. The light emitted from the light sources 210 provided inside the guide parts 310 and the light emitted from the light sources 210 provided outside the guide parts 310 may be emitted with different lighting areas through the light cover 400.

The flexible substrate 220 is configured to be deformable. Accordingly, the flexible substrate 220 may be stably mounted by matching the flexible substrate 220 to the housing 100 according to the shape of the exterior parts of the vehicle. The flexible substrate 220 may be configured to be divided into a plurality of separate substrates 220. A DC/DC converter C may be mounted in the housing 100 so that power for lighting the light sources 210 may be supplied to each flexible substrate 220.

Meanwhile, in the light cover 400, the second transmission parts 420 are formed to have a pattern and are spaced apart from each other. The first transmission part or parts 410 may extend to cross between the second transmission parts 420.

Figure 4:
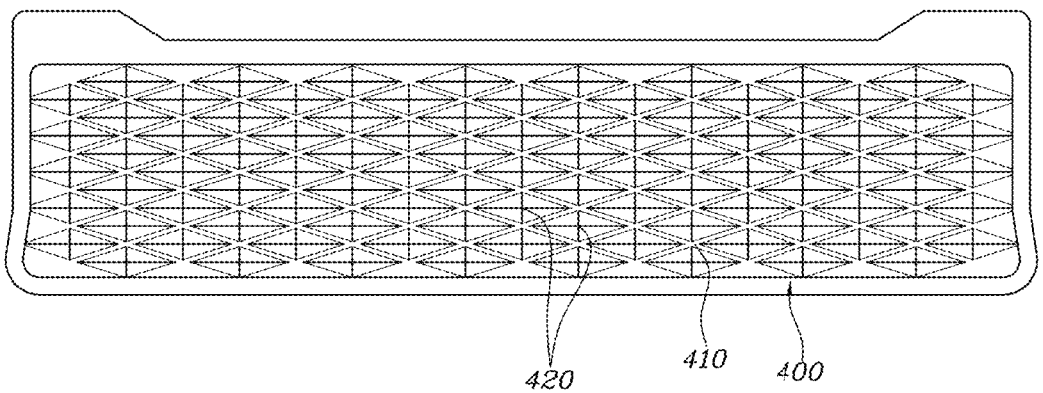
FIG. 4 is a view showing a light cover of the external lighting apparatus shown in FIG. 1.

According to an embodiment of the present disclosure, as shown in FIG. 4, when the light cover 400 is viewed from the front, the second transmission parts 420 are formed in a diamond shape and the first transmission part or parts 410 may extend obliquely as the first transmission part or parts 410 cross between the second transmission parts 420. The pattern of the second transmission parts 420 and the first transmission part or parts 410 according to the pattern of the second transmission parts 420 may be applied in various forms other than the embodiment of the present disclosure.

As such, in the present disclosure, the light cover 400 has a form in which the first transmission part 410 and the second transmission part 420 are repeated in a specific pattern. Thus, the design is refined. Also, when the plurality of light sources 210 are selectively turned on, various illumination designs may be created through the first transmission part or parts 410 and the second transmission parts 420.

Figure 5:
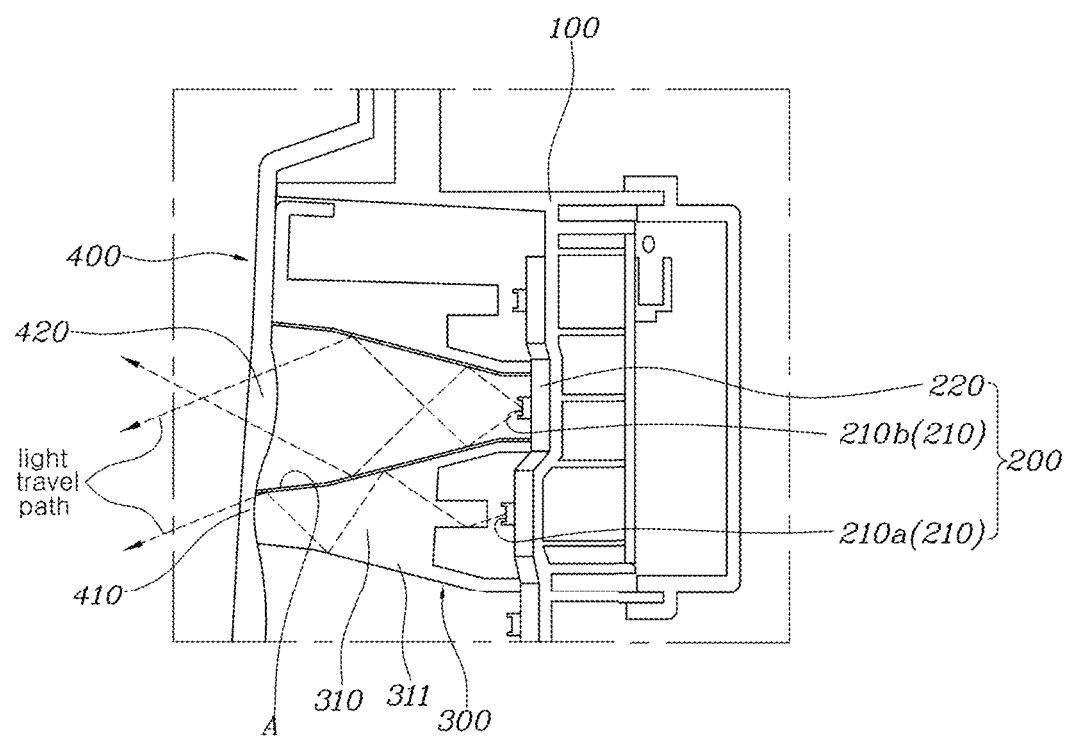
FIG. 5 is a view showing an example of a guide part of the external lighting apparatus shown in FIG. 1.

Meanwhile, as shown in FIG. 5, as each of the guide parts 310 is formed to narrow toward the light cover 400, an outer portion 311 is formed to be inclined. The end of the narrowed part may match the respective second transmission part 420.

In this way, as the guide part 310 extends to narrow toward the light cover 400, the outer portion 311 is inclined so that light is totally reflected from the outer portion 311 and may travel toward the light cover 400.

In other words, light emitted from the light source 210a located inside the guide part 310 travels toward the first transmission part 410. As some of the light is reflected on the outer portion 311, the amount of light moving toward the first transmission part 410 may be secured. Particularly, in the present disclosure, as the first transmission part or parts 410 is formed in a pattern extending between the second transmission parts 420, light is emitted with a smaller width through the first transmission part 410 compared to the second transmission part 420. In addition, as the guide part 310 corresponds to the shape of the first transmission part 410 by being formed to narrow toward the light cover 400, and as the light of the light source 210 is collected inside the guide part 310 and emitted through the first transmission part 410, the amount of light is secured and the visibility of an illumination image may be improved.

Furthermore, light emitted from a light source 210 located outside a guide part 310 is moved toward the respective second transmission part 420. As the light is reflected by different guide parts 310 disposed adjacently around the light source 210 provided outside the guide parts 310, the amount of light moving to the second transmission part 420 may be secured. In addition, as the guide parts 310 are formed to narrow toward the light cover 400, each guide part 310 forms a widening shape around the light source 210 disposed outside the guide parts 310. Due to this, as light from the light source 210 diffuses outside the guide part 310 and is emitted through the second transmission part 420, an illumination image by means of the second transmission part 420 may be formed.

Figure 6:
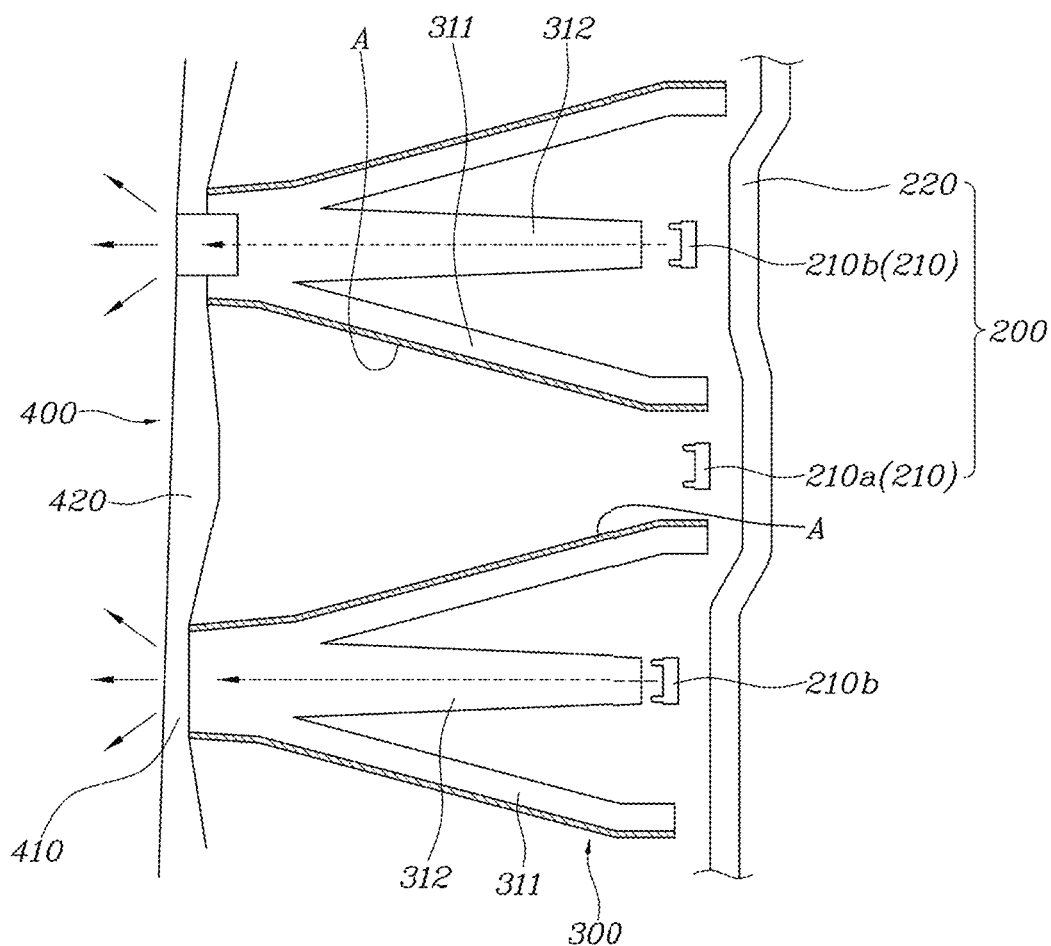
FIG. 6 is a view showing another example of a guide part of the external lighting apparatus shown in FIG. 1.

Meanwhile, as another embodiment of the present disclosure, as shown in FIG. 6, a light reflecting material A may be deposited on the guide parts 310 so that light is reflected on the outer portion 311.

The light reflecting material A may be titanium dioxide (TiO2), zinc oxide (ZnO), silicone dioxide (SiO2), antimony trioxide (Sb2O3), fluorine molecules, or the like. When the light emitted from the light source 210 is incident on the outer portion 311 of the guide part 310, the light is reflected on the surface on which the light reflecting material A is deposited and travels to the light cover 400.

In addition, as the light reflecting material A is deposited on the outer portion 311 of the guide part 310, the penetration of light moving from the inside to the outside or the penetration of light moving from the outside to the inside is blocked. Thus, light is not leaked through the transmission parts of the light cover 400.

As such, as the light reflecting material A is deposited on the outer portion 311 of the guide part 310, the light emitted from the light source 210 inside the guide part 310 and the light emitted from the light source 210 outside the guide part 310 are separated and emitted separately through the first transmission part or parts 410 and the second transmission parts 420 of the light cover 400. Thus, an illumination image appearing through the first transmission part or parts 410 and an illumination image appearing through the second transmission parts 420 are clearly distinguished, thereby improving visibility of the images.

Meanwhile, as shown in FIG. 6, a light incident portion 312 may be formed inside the guide part 310 extending to the light source 210 to receive the light emitted from the light source 210 and reflecting the incident light. Thus, the light travels toward the first transmission part 410.

In this way, as the guide part 310 is provided with the light incident portion 312, and the light incident portion 312 is formed to extend from the first transmission part 410 to the light source 210, after the light emitted from the light source 210 is incident on the light incident portion 312, the light may travel straight or directly to the first transmission part 410 within the light incident portion 312. The light incident portion 312 may be formed such that light emitted from the first light source 210 is changed into parallel light. In addition, since the light incident portion 312 is connected to the guide part 310, the light guide 300 may be configured by integrating the guide parts 310 and the light incident portions 312.

Figure 7:
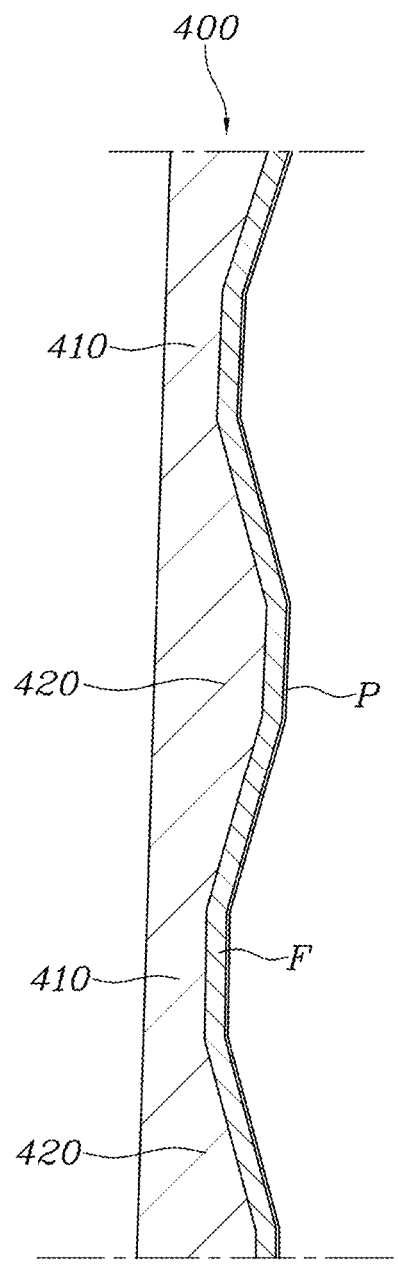
FIG. 7 is a view showing the light cover with an example of a second transmission part in the external lighting apparatus shown in FIG. 1.

As shown in FIG. 7, in the light cover 400, the first transmission part 410 and the second transmission part 420 may have different thicknesses.

By making a difference in the thickness of the first transmission part 410 and the second transmission part 420, it is possible to form a three-dimensional effect when looking at the light cover 400 from the outside. In other words, as the thicknesses of the first transmission part 410 and the second transmission part 420 of the light cover 400 are different, the sense of depth of light passing through the first transmission part 410 and the second transmission part 420 may be different. Thus, an illumination image created by the light finally emitted through the light cover 400 may be realized in a dynamic shape.

In the light cover 400, the first transmission part 410 may have a lesser thickness than the second transmission part 420.

In the present disclosure, as the second transmission parts 420 form a pattern shape and the first transmission part 410 extends to cross between the second transmission parts 420, the light emission area of the first transmission part 410 is smaller than the light emission area of the second transmission part 420.

The first transmission part 410 is formed to have a lesser thickness compared to the second transmission part 420. Thus, as light emitted from the light source 210 inside the guide part 310 of the light guide 300 is reflected and collected inside the guide part 310 and emitted through the relatively thin first transmission part 410, a clear illumination image may be formed.

On the other hand, the second transmission part 420 is formed to have a greater thickness compared to the first transmission part 410. Thus, as light emitted from the light source 210 outside the guide part 310 of the light guide 300 is reflected and diffused from the outside of the adjacent guide part 310 and emitted through the relatively thick second transmission part 420, the light is diffused, and an illumination image according to the pattern shape of the second transmission part 420 may be formed.

As such, since the first transmission part 410 and the second transmission part 420 have a difference in thickness, the illumination image appearing through the first transmission part 410 and the illumination image appearing through the second transmission part 420 have a different sense of depth. Thus, a three-dimensional and dynamic image is realized, leading to an improved quality and marketability.

Meanwhile, the light cover 400 is provided with an insert film F. A light transmission paint P or a light blocking material B may be deposited on the insert film F.

In other words, on the rear side of the light cover 400, the insert film F is seated and injected according to the shape, color, and light transmittance required for exterior parts. Due to this, the light cover 400 realizes the design of the exterior part, and the light transmission paint P or the light blocking material B is applied with the insert film F as a medium. Thus, an illumination image of the light cover 400 may be diversified.

As an example of this, as shown in FIG. 7, by depositing the light transmission paint P on the second transmission part 420 of the light cover 400, light may be transmitted through the entire area of the light cover 400. Accordingly, when light is emitted from individual light sources 210, the boundary between the first transmission part 410 and the second transmission part 420 is blurred so that an illumination image may be formed on the entire light cover 400.

Meanwhile, as another example, the light blocking material B may be deposited on the second transmission part 420 of the light cover 400 so that light is not transmitted in the remaining area except for the point matched in a straight line with the light source 210.

Figure 8:
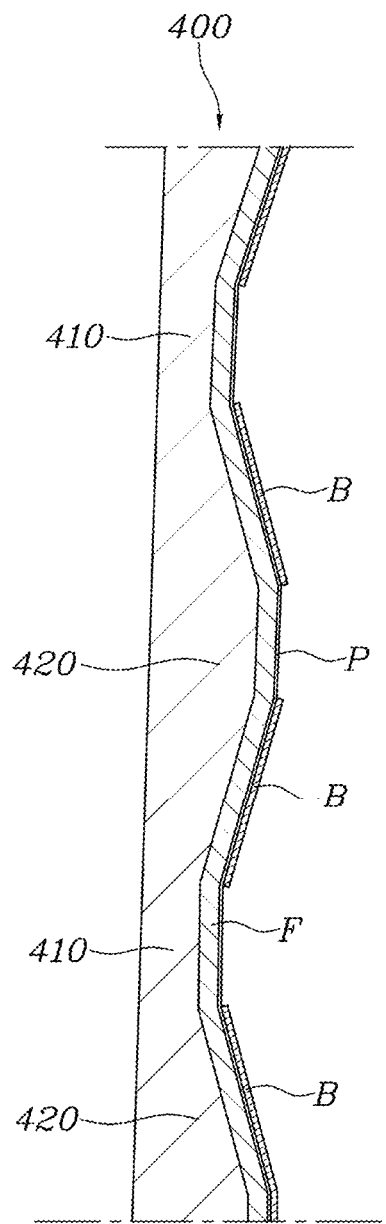
FIG. 8 is a view showing the light cover with another example of a second transmission part in the external lighting apparatus shown in FIG. 1.

As shown in FIG. 8, the light blocking material B may be deposited on the second transmission part 420 of the light cover 400. Here, the light blocking material B is a black paint, which blocks the movement or passage of light. Additionally, in a state in which the light transmission paint P is deposited on the second transmission part 420, the light blocking material B may be deposited on the surface of the light transmission paint P.

Accordingly, when light emitted from the light source 210 disposed outside the guide part 310 is reflected by the adjacent guide part 310 and travels toward the second transmission part 420, the light is emitted through a portion where the light blocking material B is not deposited since the light blocking material B is deposited on the second transmission part 420 except for the position matched with the light source 210 in a straight line.

Due to this, the light emitted through the second transmission part 420 is emitted in a small area. As the light is emitted only through the portion of the second transmission part 420 where the light blocking material B is not deposited, an illumination image becomes clear. The illumination image created through the second transmission part 420 is specified to obtain an illumination image distinguished from that of the first transmission part 410.

Meanwhile, in the present disclosure, a controller 500 that controls the light source module 200 may be further included. The controller 500 may control the light source module 200 so that some of the light sources 210 are turned on or individual light sources 210 are sequentially turned on according to specific information including driving status, surrounding environment, message conveying, and charging status obtained by means of various sensors, GPS, and/or the like.

Figure 9:
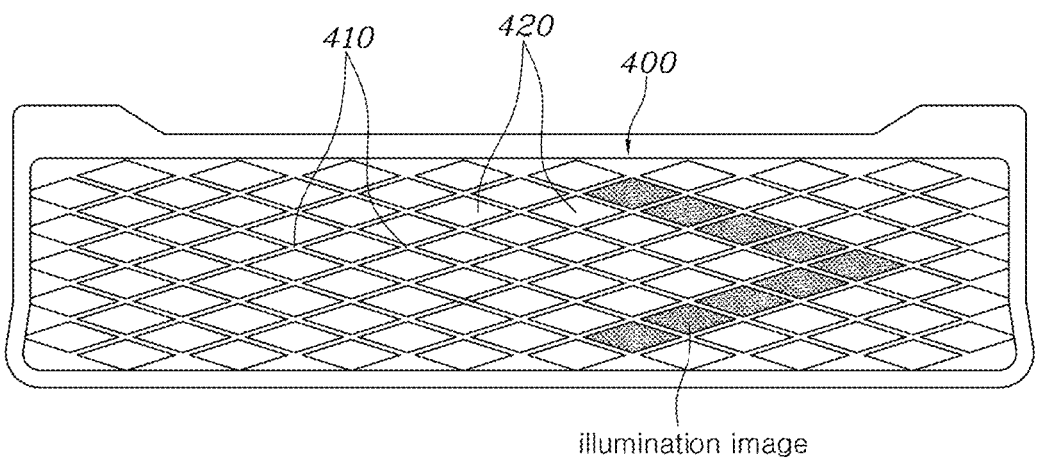
FIG. 9 is a view showing an operation of the external lighting apparatus according to the present disclosure.

For example, when it is determined that a vehicle will turn left, the controller 500 may control the light source module 200 to form an illumination image finally emitted through the light cover 400 as shown in FIG. 9. At this time, since message conveying is important, light may be emitted only from the second transmission part 420 forming a pattern in the light cover 400.

In addition to the driving direction, various messages may be made by selectively controlling the lighting and extinguishing, i.e., turning on and off, of the individual light sources 210 of the light source module 200.

Furthermore, the controller 500 may control the light source module 200 so that the plurality of light sources 210 are sequentially turned on or repeatedly turned on to create various illumination images such as a welcome function, a battery charge state, a goodbye function, and/or the like.

Figure 10:
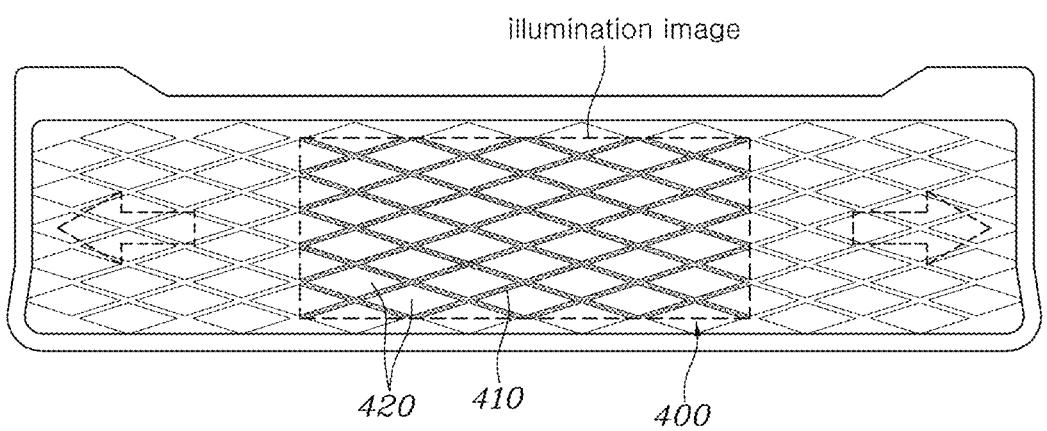
FIG. 10 is a view showing another operation of the external lighting apparatus according to the present disclosure.

For example, as shown in FIG. 10, an illumination image finally emitted through the light cover 400 may be diffused from the center of the light cover 400 to the left and right. Depending on the design, various illumination images may be realized by allowing light to be emitted from either one of the first transmission part or parts 410 or the second transmission part or parts 420 or from both the first transmission part or parts 410 and the second transmission part or parts 420.

As described above, according to the external lighting apparatus of the present disclosure, various messages may be delivered through lighting by applying a lighting function to the exterior of a vehicle. Also, marketability of the vehicle may be improved by refining the exterior design.

Moreover, it is possible to produce external lighting apparatuses having various types of lighting designs according to design requirements.

Although the present disclosure is provided above in relation to specific embodiments shown in the drawings, it should be apparent to those of ordinary skill in the art that the embodiments of the present disclosure may be changed and modified in various ways without departing from the scope of the present disclosure, which is described in the following claims.

The invention claimed is:

1. An external lighting apparatus comprising:
   a light source module provided with a plurality of light sources;
   a light guide in which light emitted from each light source of the plurality of light sources is incident, the light guide configured to reflect the incident light so that the light travels in different areas; and
   a light cover composed of a plurality of transmission parts into which the light, travelling in different areas via the light guide, is incident, wherein the light is emitted to different lighting areas through each transmission part of the plurality of transmission parts to create a plurality of illumination images,
   wherein the light guide is provided with a plurality of guide parts for guiding the light emitted from each light source of the plurality of light sources, and
   wherein the plurality of guide parts reflect light inward and outward so that light emitted from inner light sources of the plurality of light sources is reflected from inside the plurality of guide parts while light emitted from remaining light sources of the plurality of light sources is reflected from outside the plurality of guide parts.

2. The external lighting apparatus of claim 1, wherein the light source module comprises:
   the plurality of light sources configured to be individually lit; and
   a flexible substrate configured to be deformable, wherein the plurality of light sources are mounted thereon at regular intervals.

3. The external lighting apparatus of claim 1, wherein, among the plurality of light sources of the light source module, the inner light sources are respectively disposed inside the plurality of guide parts, and the remaining light sources are disposed between the plurality of guide parts.

4. The external lighting apparatus of claim 1, wherein the plurality of transmission parts of the light cover comprises:
   a first transmission part into which light from the inside of the plurality of guide parts is incident; and
   a second transmission part into which light from the outside of the plurality of guide parts is incident,
   wherein the first transmission part and the second transmission part are disposed to have different lighting areas.

5. The external lighting apparatus of claim 4, wherein, in the light cover, a plurality of second transmission parts is provided to have a pattern and the plurality of second transmission parts are spaced apart from each other, and wherein the first transmission part extends to cross between the plurality of second transmission parts.

6. The external lighting apparatus of claim 4, wherein, as each guide part of the plurality of guide parts narrows to a narrowed part toward the light cover, an outer portion is inclined, and wherein an end of each narrowed part matches a corresponding second transmission part of the plurality of second transmission parts.

7. The external lighting apparatus of claim 6, wherein a light reflecting material is deposited on the outside of each guide part.

8. The external lighting apparatus of claim 6, wherein a light incident portion is provided inside each guide part extends to the respective light source of the plurality of light sources so that light emitted from the respective light source is incident and to reflect the incident light so that the light travels toward the first transmission part.

9. The external lighting apparatus of claim 4, wherein, in the light cover, the first transmission part and the second transmission part have different thicknesses.

10. The external lighting apparatus of claim 9, wherein, in the light cover, the first transmission part has a lesser thickness than the second transmission part.

11. The external lighting apparatus of claim 4, wherein a light blocking material is deposited on portions of the second transmission part of the light cover so that light is not transmitted in a remaining area thereof except for points matched in a straight line with the plurality of light sources.

12. The external lighting apparatus of claim 1, further comprising:
a controller configured to control the light source module, so that some of the plurality of light sources are turned on or individual light sources of the plurality of light sources are sequentially turned on according to specific information including driving status, surrounding environment, message conveying, or charging status.

13. The external lighting apparatus of claim 1, wherein the light cover is an exterior part of a vehicle.

14. The external lighting apparatus of claim 13, wherein the exterior part is a front grill, an exterior panel, or a lamp of the vehicle.

15. The external lighting apparatus of claim 1, wherein the light cover is provided with an insert film and a light transmission paint or a light blocking material is deposited on the insert film.

* * * * *